(12) United States Patent
Jeon

(10) Patent No.: US 6,418,541 B1
(45) Date of Patent: Jul. 9, 2002

(54) METHOD OF TESTING COMPUTER SYSTEM WITH HARD DISK

(75) Inventor: Young-Il Jeon, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 543 days.

(21) Appl. No.: 08/916,340

(22) Filed: Aug. 22, 1997

(30) Foreign Application Priority Data

Aug. 23, 1996 (KR) .............................. 96-35113

(51) Int. Cl.⁷ .................. H02H 3/05; G11C 29/00; G06F 15/177
(52) U.S. Cl. .................. 714/36; 714/721; 709/222
(58) Field of Search .................. 395/183.12, 183.01, 395/651, 652, 497.01, 497.04; 714/721, 222, 36; 709/221

(56) References Cited

U.S. PATENT DOCUMENTS

| | | | | |
|---|---|---|---|---|
| 4,148,084 A | * | 4/1979 | Gyi ............................. | 360/98 |
| 4,885,683 A | | 12/1989 | Coogan ....................... | 364/200 |
| 5,136,711 A | * | 8/1992 | Hugard et al. .............. | 395/700 |
| 5,136,713 A | * | 8/1992 | Bealkowski et al. ........ | 395/700 |
| 5,155,844 A | | 10/1992 | Cheng et al. .......... | 395/183.12 |
| 5,255,385 A | | 10/1993 | Kikuchi ....................... | 395/575 |
| 5,430,866 A | | 7/1995 | Lawrence et al. .......... | 395/575 |
| 5,463,766 A | | 10/1995 | Schieve et al. ............. | 395/650 |
| 5,491,790 A | | 2/1996 | Keeley et al. ......... | 395/183.12 |
| 5,537,537 A | | 7/1996 | Fujikawa et al. ...... | 395/183.06 |
| 5,537,540 A | * | 7/1996 | Miller et al. .......... | 395/183.14 |
| 5,568,629 A | * | 10/1996 | Gentry et al. ............... | 395/441 |
| 5,574,914 A | * | 11/1996 | Hancock et al. ............ | 395/650 |
| 5,586,327 A | * | 12/1996 | Bealkowski et al. ........ | 395/652 |
| 5,596,711 A | * | 1/1997 | Burckhartt et al. .... | 395/182.21 |
| 5,615,335 A | | 3/1997 | Onffroy et al. ........ | 395/183.06 |
| 5,675,769 A | * | 10/1997 | Ruff et al. ............. | 395/497.04 |
| 5,689,726 A | * | 11/1997 | Lin ............................. | 395/830 |
| 5,692,129 A | * | 11/1997 | Sonderegger et al. .. | 395/200.11 |
| 5,694,583 A | * | 12/1997 | Williams et al. ............ | 395/520 |
| 5,701,477 A | * | 12/1997 | Chejlava, Jr. ............... | 395/652 |
| 5,706,472 A | * | 1/1998 | Ruff et al. ............. | 395/497.04 |
| 5,715,456 A | * | 2/1998 | Bennett et al. ............. | 395/652 |
| 5,748,877 A | * | 5/1998 | Dollahita et al. ...... | 395/183.12 |
| 5,794,052 A | * | 8/1998 | Harding ....................... | 395/712 |
| 5,802,363 A | * | 9/1998 | Williams et al. ............ | 395/652 |
| 5,836,013 A | * | 11/1998 | Green et al. ................ | 395/652 |
| 5,859,978 A | * | 1/1999 | Sonderegger et al. .. | 395/200.56 |

\* cited by examiner

*Primary Examiner*—Norman Michael Wright
(74) *Attorney, Agent, or Firm*—Robert E. Bushnell, Esq.

(57) ABSTRACT

A method of testing a computer system includes the steps of partitioning a physically formatted hard disk to define a whole region of the hard disk as a first partition region and a part of the first partition region as a second partition region, setting the second partition region as a boot driver, installing a test program file in the second partition region to form an original hard disk, testing the computer system using the test program file in the second partition region, erasing the second partition region overlapped with part of the first partition region, and setting the first partition region as a boot driver region. To substantially test the computer system, the program files which are installed on the first and second partition regions of the original hard disk are duplicated on other hard disks with a disk duplicating apparatus. The hard disks thus duplicated are established in computer systems, respectively. If the computer system with the duplicated hard disk is powered, it is booted with an operation program installed in the second partition region. Then, the computer system executes the test program and starts to test whether or not it is operating normally. At the completion of this test, the second partition region is erased and then the first partition region is set as a boot driver region.

15 Claims, 7 Drawing Sheets

METHOD OF TESTING COMPUTER SYSTEM WITH HARD DISK

CLAIM OF PRIORITY

This application makes reference to, incorporates the same herein, and claims all benefits accruing under 35 U.S.C. §119 from an application for METHOD FOR TESTING COMPUTER SYSTEM WITH HARD DISK earlier filed in the Korean Industrial Property Office on the 23$^{rd}$ of August 1996 and there duly assigned Ser. No. 35113/1996.

BACKGROUND OF THE INVENTION

1. Field of the Invention

The present invention relates to a method of testing operations of a computer system with a hard disk, and more particularly to a more efficient method of testing a computer system by using a hard disk located therein.

2. Description of the Related Art

Once computer systems have been produced, they are subjected to a computer testing process for testing whether each of the produced computer systems is operating normally using a test program installed on a hard disk therein, and for testing whether programs installed on the hard disk are executed normally.

Personal computers operating with a DOS (Disk Operating System) program can be powered offjust after their operations are tested. However, when computer systems are booted with Windows 95 of the Microsoft Corporation, which is installed in a computer system as an operating system, and tested by a test program to detect whether or not they are operating normally, there arise several problems when the computer system is tested in accordance with conventional testing methods using floppy disks.

First, since a computer system is tested by using a floppy disk inserted therein, the test speed thereof is relatively lower due to a comparatively slow disk access time.

Secondly, it is impossible to test the computer system with a new operating system by using only a floppy disk. Also, when a computer system is initially operated with an operating system to which a specific product number is assigned, information such as product number and the like must be entered into the computer system by a user. Since the information of an operating system to be installed into a plurality of produced computer systems are different from one another, a longer time is required to input the information into respective computer systems for testing.

To overcome the above described problems, a software maker supplies a so-called "AUDIT" mode execution program for a hardware maker. If the "AUDIT" mode execution program is provided for the produced computer systems, each of the computer systems can be tested without the input of information. For example, if a computer system is initially booted with the Windows 95 operating system of the Microsoft Corporation to be tested as to whether or not the computer system is operating normally, there is no need for inputting information into the computer system by means of a so-called "Pre-Installer" program, which has been provided by the company.

In an earlier method of testing a computer system with a hard disk, and installing a plurality of program files on the hard disk in accordance with the earlier method, a physically formatted hard disk is partitioned by means of an FDISK.EXE file to use a whole region thereof as one partition region, and then the partitioned hard disk is logically formatted by means of a FORMAT.EXE file. The Windows 95 operating system is installed on the hard disk by means of a Pre-Installer, and device drivers necessary for operations of the computer system are sequentially installed on the hard disk. Application program files to be used by a user are also installed on the hard disk. The above described files are stored on the hard disk.

Information of the hard disk serving as an original hard disk are duplicated on other hard disks by using a disk duplicating apparatus, and the duplicated hard disk is established in a computer system.

The computer system is booted with DOS on a floppy disk serving as a boot drive, and then a test program for DOS is executed in the computer system to test whether or not the computer system is operating normally. The Pre-Installer as well as a test program for Windows 95 is then installed on the hard disk.

Next, the computer system is booted with the Windows 95 operating system on the hard disk serving as a boot drive and then the test program for Windows 95 is executed to test whether or not the computer system is operating normally.

Finally, the test program for the Windows 95 operating system and the Pre-Installer are erased from the hard disk.

According to this method for testing the computer system, there frequently arises a serious problem in that programs which are normally performed under a user' computer environment are not normally performed under the AUDIT mode.

Also, if application programs are installed using the Windows 95 operating system on the hard disk during the AUDIT mode, they should be completely erased from the hard disk after the test of the computer system because an initializing file may be changed due to the remaining application programs on the hard disk. If not, since unnecessary information remains on the hard disk serving as a boot drive, a test operator waits for the computer system to be normally terminated. As a result, it takes the operator a long time to test the computer system.

Furthermore, since the computer system is booted with DOS on a floppy disk, a relatively long time is required for booting the computer system.

The following patents each disclose features in common with the present invention but do not teach or suggest the specifically recited method of testing operations of a computer system with a hard disk as in the present invention: U.S. Pat. No. 5,155,844 to Cheng et al., entitled Background Memory Test During System Start Up, U.S. Pat. No. 4,885,683 to Coogan, entitled Self-Testing Peripheral-Controller system, U.S. Pat. No. 5,430,866 to Lawrence et al., entitled Method And Apparatus For Deriving Mirrored Unit State When Re-Initializing A System, U.S. Pat. No. 5,463,766 to Schieve et al., entitled System And Method For Loading Diagnostics routines From Disk, U.S. Pat. No. 5,491,790 to Keeley et al., entitled Power-On Sequencing Apparatus For Initializing And Testing A System Processing Unit, U.S. Pat. No. 5,615,335 to Onffroy et al., entitled Storage System Self-Test Apparatus And Method, U.S. Pat. No. 5,255,385 to Kikuchi entitled Method Of Testing Program And Compiler And Program Testing Tool For The Method, and U.S. Pat. No. 5,537,537 to Fujikawa et al., entitled Burn-In diagnostic Technique For A Disc Driving Apparatus.

SUMMARY OF THE INVENTION

It is, therefore, an object of the present invention to provide a method of easily testing a computer system using a hard disk, which is partitioned into first and second partition regions, in which overall operations of the computer system are tested with a test program installed in the second partition region and after the completion of the test, the second partition region is erased.

According to one aspect of the present invention, a method of testing a computer system with a hard disk which is physically formatted, comprises the steps of defining a whole region of said hard disk as a first partition region; installing a plurality of program files necessary for operations of said computer system in said first partition region; partitioning said hard disk to define a part of said first partition region as a second partition region, said second partition region being overlapped with part of said first partition region; setting said second partition region as a boot driver; installing said program files in said second partition region; re-booting said computer system using said second partition region; installing a test program file in said second partition region to form an original hard disk; testing said computer system using said test program file in said second partition region; erasing said second partition region overlapped with said first partition region; and setting said first partition region as a boot driver region.

In this embodiment, the step of defining said first partition region comprises partitioning said hard disk to use said whole region of said hard disk as said first partition region, and logically formatting said first partition region.

In this embodiment, the step of installing said plurality of program files necessary for the operations of said computer system comprises installing an operating system in said first partition region, installing a plurality of device drivers in said first partition region and installing a plurality of application programs in the first partition region.

In this embodiment, the step of partitioning said hard disk to define said second partition region comprises detecting a starting position of areas where data is not stored on said hard disk, and setting said starting position as a starting position of said second partition region.

In this embodiment, the step of partitioning said hard disk to define said second partition region comprises setting a starting position of said second partition region by a user.

In this embodiment, the step of re-booting said computer system is performed in accordance with an operating system located in said second partition region.

In this embodiment, the step of installing said test program file in said second partition region comprises duplicating said plurality of the program files installed in said first partition region into said second partition region.

In this embodiment, the method further comprises the steps of duplicating, after installing said test program file in said second partition region, said program files of said original hard disk on a plurality of other hard disks by means of a disk duplicating apparatus to form a plurality of duplicated hard disks, and establishing one of said duplicated hard disks in a computer system.

According to another aspect of the present invention, a method for testing a computer system with a hard disk which is physically formatted, comprises the steps of partitioning said hard disk to define a whole region of said hard disk as a first partition region and a part of said first partition region as a second partition region, said first second partition region being overlapped with part of said first partition region; installing a plurality of program files necessary for operations of said computer system in said first partition region; setting said second partition region as a boot driver; installing said program files in said second partition region; re-booting said computer system using said second partition region; installing a test program file in said second partition region to form an original hard disk; testing said computer system using said test program file in said second partition region; erasing said second partition region overlapped with said first partition region; and setting said first partition region as a boot driver region.

According to a further aspect of the present invention, a method for testing a computer system with a hard disk which is physically formatted, comprises the steps of partitioning said hard disk to define a whole region of said hard disk as a first partition region and a part of said first partition region as a second partition region, said first second partition region being overlapped with part of said first partition region; sequentially installing a plurality of program files necessary for operations of said computer system in said first and second partition regions; setting said second partition region as a boot driver; re-booting said computer system using said second partition region; installing a test program file in said second partition region to form an original hard disk; testing said computer system using said test program file in said second partition region; erasing said second partition region overlapped with said first partition region; and setting said first partition region as a boot driver region.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
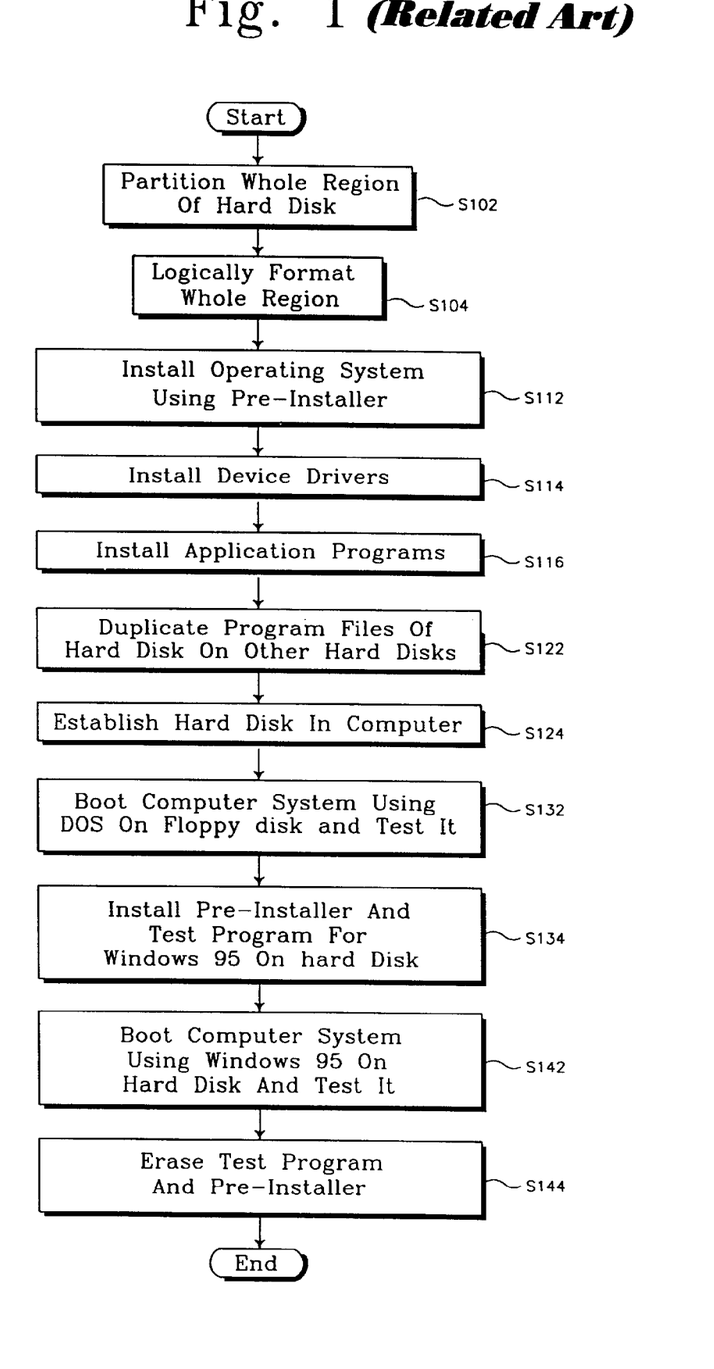
FIG. 1 is a flowchart illustrating an earlier method of testing a computer system with a hard disk.

FIG. 1 is a flowchart illustrating an earlier method of testing a computer system with a hard disk and FIGS. 2A–2D illustrate a sequence of installing a plurality of program files on the hard disk in accordance with an earlier method. The earlier method of FIGS. 1 and 2A–2D is the method discussed in detail in the Description of the Related Art above.

Figure 2A:
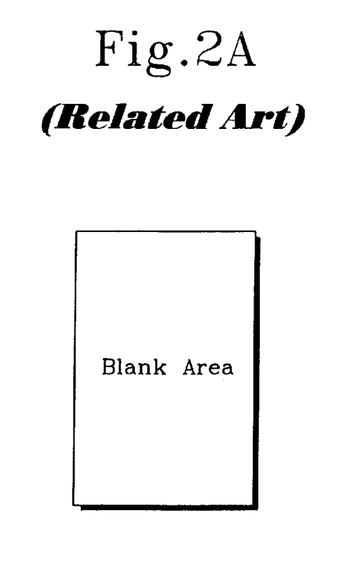
FIGS. 2A–2D illustrate a sequence of installing a plurality of program files on the hard disk in accordance with the earlier method.

At step S102 a physically formatted hard disk is partitioned to use a whole region thereof as one partition region and then the partition hard disk is logically formatted as shown in FIG. 2A at step S104.

Figure 2B:
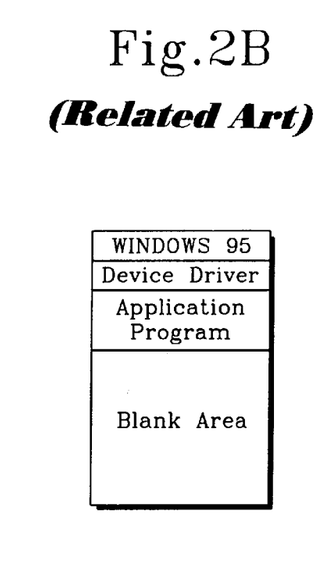

At step S112, the Windows operating system is installed on the hard disk and the device drives necessary for the operations of the computer system are installed on the hard disk at step S114. Application program files to be used by a user are also installed on the hard disk at step S116. FIG. 2B illustrates the abovedescribed files being stored on the hard disk.

At step S122, the information of the hard disk serving as an original hard disk is duplicated on other hard disks by using a disk duplicating apparatus and at step S124, the duplicated hard disk is established in a computer system.

At step S132, the computer system is booted with a DOS operating system on a floppy disk serving as a boot drive and then a test program for DOS is executed in the computer system.

Figure 2C:
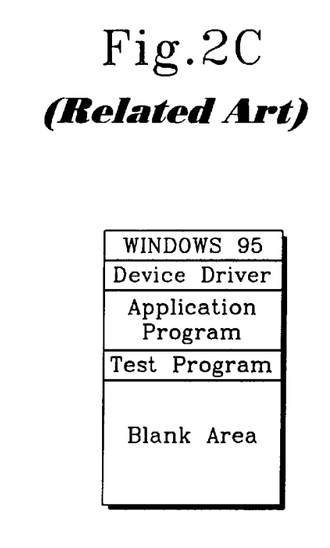

At step S134, a pre-installer as well as a test program for Windows 95 is then installed on the hard disk as shown in FIG. 2C.

Figure 2D:
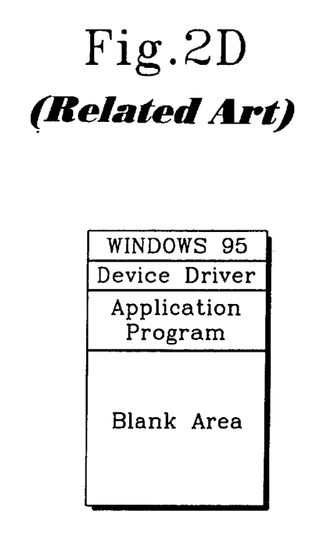

At step S142, the computer system is booted with the Windows 95 operating system and the pre-installer is erased from the hard disk as shown in FIG. 2D.

Figure 3A:
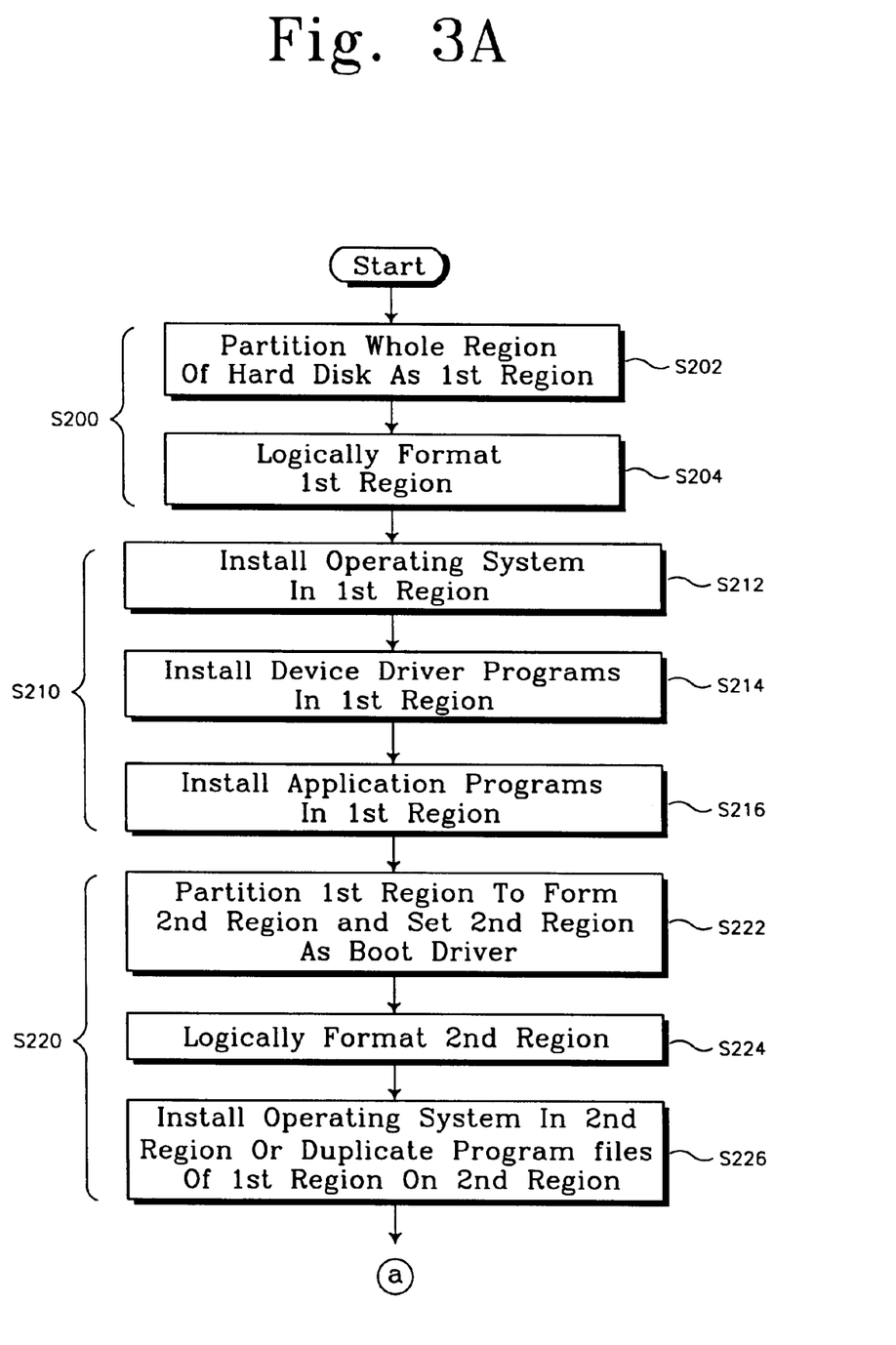
FIGS. 3A and 3B are flowcharts illustrating a novel method of testing a computer system in accordance with an embodiment of the present invention.
Figure 3B:
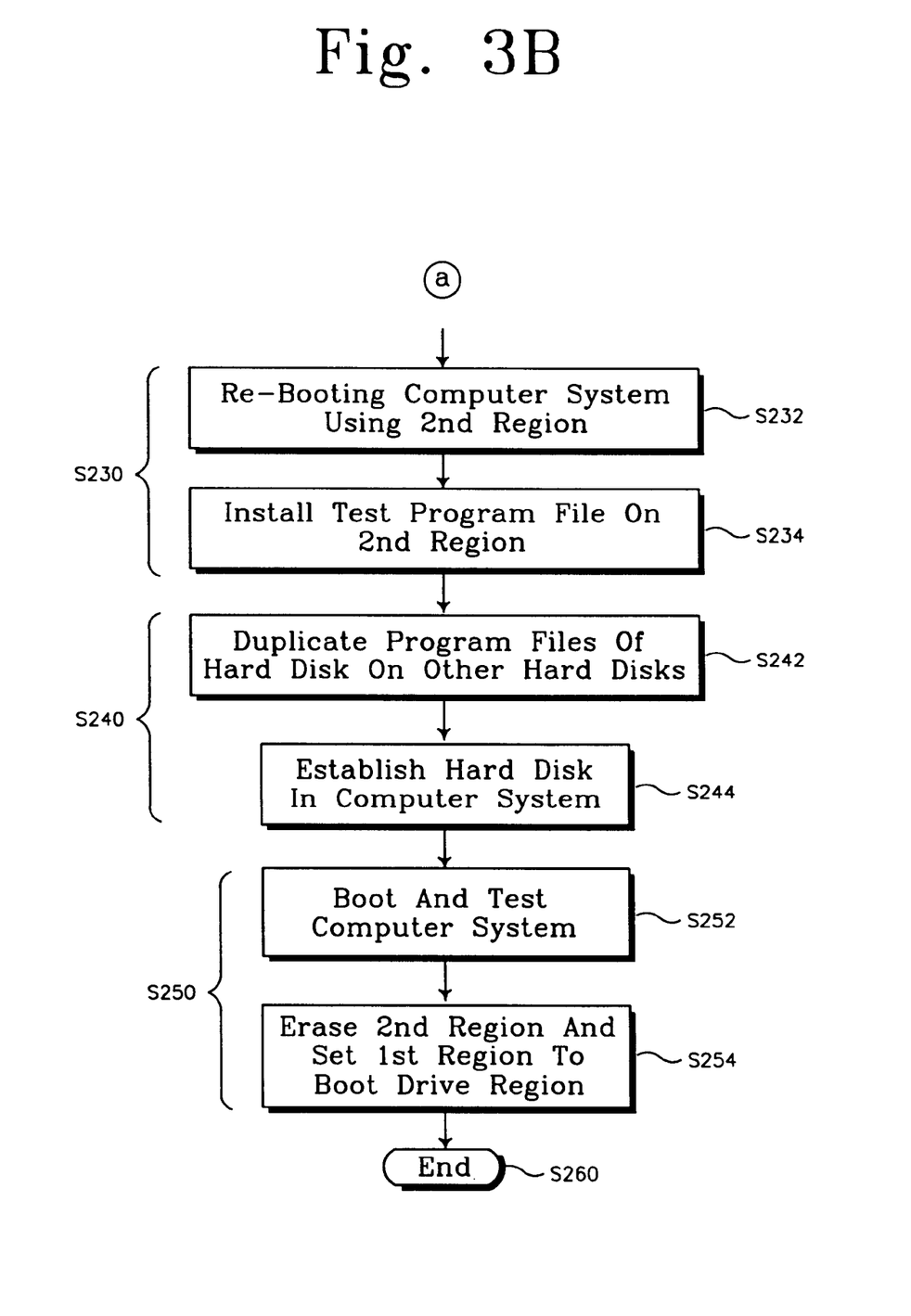

Referring to FIGS. 3A and 3B, a novel method of testing a computer system in accordance with the present invention comprises the steps of partitioning a physically formatted hard disk to define a whole region of the hard disk as a first partition region and a part of the first partition region as a second partition region, setting the second partition region as a boot driver, installing a test program file in the second partition region to form an original hard disk, testing the computer system using the test program file in said second partition region, erasing the second partition region overlapped with the part of the first partition region, and setting the first partition region as a boot driver region. To substantially test the other computer systems, all the program files which are installed on the first and second partition regions of the original hard disk are duplicated on other hard disks by means of a disk duplicating apparatus after installing the test program. The hard disks thus duplicated are established in produced computer systems, respectively. If the computer system with the duplicated hard disk is powered, it is booted with an operation program installed in the second partition region. Then, the computer system executes the test program and starts to test whether or not it is operating normally. At the completion of this test, the second partition region is erased and then the first partition region is set to an active region for booting, i.e., as a boot driver region.

Hereinafter, the method of testing a computer system in accordance with an embodiment of the present invention will be described with reference to the accompanying drawings. In this embodiment, for instance, Windows 95 may be used as an operating system.

Figure 4A:
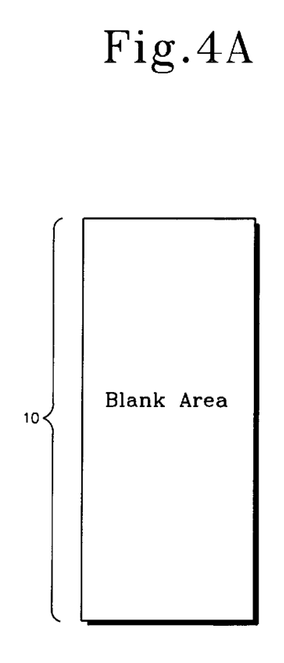
FIGS. 4A through 4E illustrate a sequence of installing a plurality of program files on the hard disk in accordance with the novel testing method of the present invention.

First, it is illustrated at step S200 of FIG. 3A that a hard disk is formatted so as to be used by a user. A physically formatted hard disk is, at step S202, partitioned to use a whole region thereof as one partition region (hereinafter, referred to as "a first partition region") 10, as shown in FIG. 4A, and the control proceeds to step S204 wherein the hard disk is logically formatted. In this embodiment, the physically formatted hard disk is used so as to partition the whole region thereof. A physically unformatted hard disk may be, however, used in this embodiment. In this case, the unformatted hard disk is first physically formatted, and then partitioned to use the whole region as the first partition region.

Figure 4B:
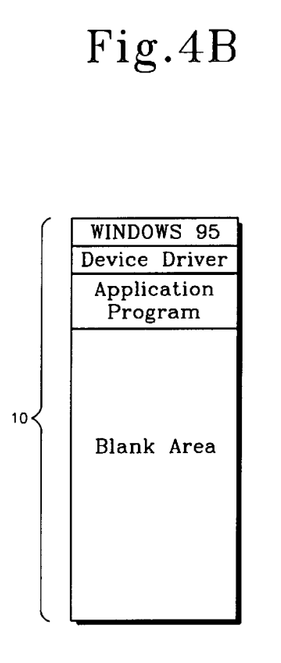

It is illustrated at step S210 that program files necessary for the operations of the computer system are sequentially installed in the first partition region 10. At step 212, an operation program such as DOS, Windows 95 or the like is installed in the first partition region 10 by means of a pre-installer. And, several device driver program files (hereinafter, referred to as "device drivers") required for the computer system are installed in the first partition region 10 and the control proceeds step S216 wherein application program files for a user are installed thereon. It is shown from FIG. 4B that the Windows 95 operating system, as well as the other program files, are located in the first partition region 10.

Figure 4C:
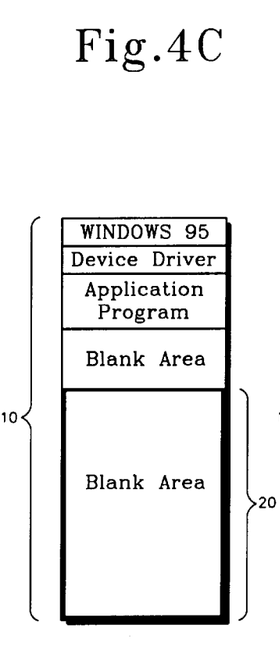
Figure 4D:
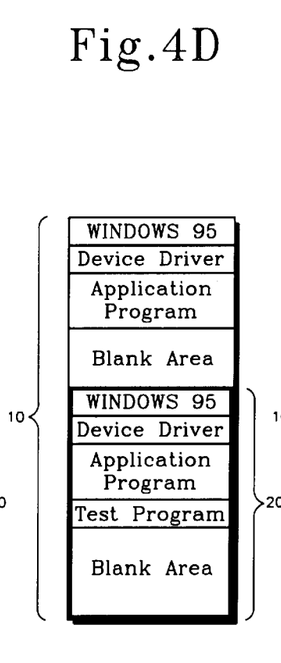
Figure 5:
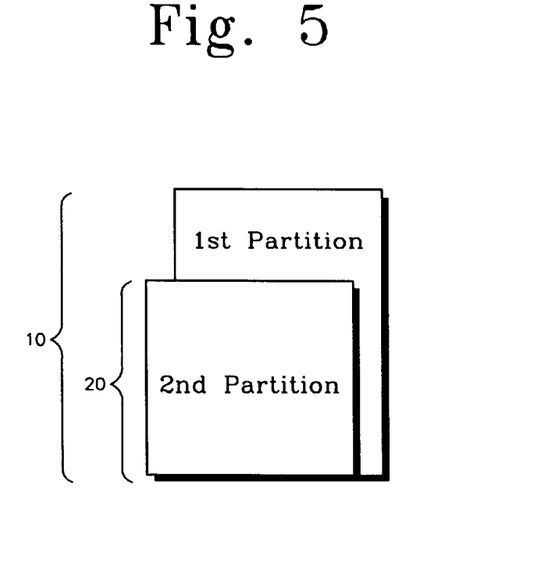
FIG. 5 illustrates the hard disk divided into two partition regions so as to explain the testing method of the present invention.

It is illustrated at step S220 that the hard disk is partitioned into two regions. At step S222, the hard disk is partitioned to define the whole region thereof as the first partition region 10 and a part of the first partition region 10 as a second partition region 20 (referring to FIG. 4C). Also, the second partition region 20 is set to a boot driver region, for example, as a boot driver The second partition region 20 is overlapped with the part of the first partition region 10, as shown in FIG. 4C and FIG. 5. The control proceeds to step S224 wherein the second partition region is logically formatted. At step S226, an operating system, for example, Windows 95 which is installed in the first partition region 10 is installed in the second partition region 20. Alternatively, the program files as well as the operating system may be installed in the second partition region 20, as shown in FIG. 4D.

Figure 6:
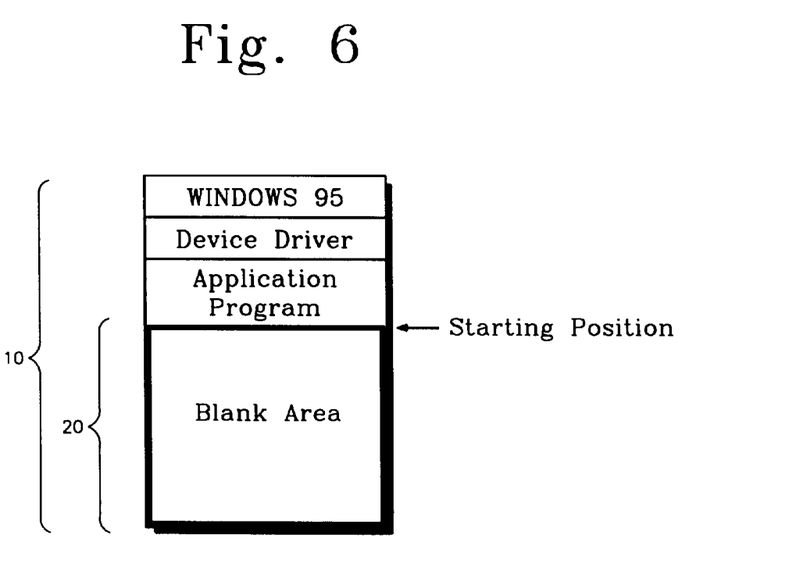
FIGS. 6 and 7 illustrate, in a block form, the hard disks each of which is divided into two partition regions in accordance with two different disk partitioning processes used in the novel testing method of the present invention.
Figure 7:
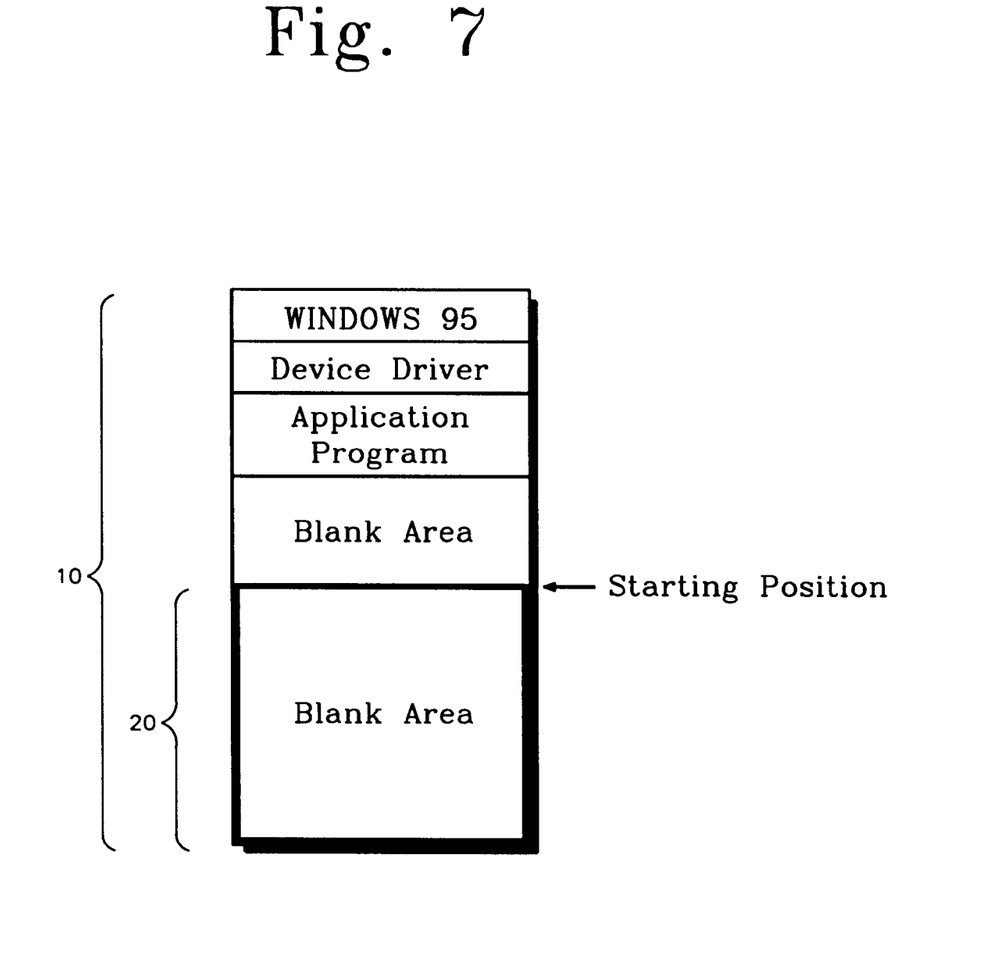

On the other hand, the partitioning of the hard disk into at least two partition regions may be achieved by two processes, one of which is to automatically detect a starting position of area where data is not stored on the hard disk and set the starting position as a starting position of the second partition region, as shown in FIG. 6, and the other of which is to set a starting position of the second partition region by a user, as shown in FIG. 7.

Referring again to FIG. 3B, it is illustrated at step S230 that the computer system is re-booted with the operating system of the second partition region 20 and a test program file is installed in the second partition region. At step S232, the computer system is re-booted by using the second partition region 20 as a boot driver and then set to the same environment as a user' computer environment. Herein, if the installed operating system is Windows 95 as shown in FIG. 4D, it is set to the same environment as a user' environment by inputting a specific product number thereof. Next, the control proceeds to step S234 wherein a test program file is installed in the second partition region 20 as shown in FIG. 4C. As a result, an original hard disk is completely produced.

It is illustrated at step S240 that the original hard disk is duplicated into other hard disks by means of a disk duplicating apparatus and the duplicated hard disks are respectively established in the produced computer systems. At step S242, all the program files of the original hard disk are duplicated on other hard disks by using a disk duplicating apparatus, and the control proceeds to step S244 wherein the duplicated hard disk is established in a computer system. If the original hard disk is directly established in a computer system, the process steps 242 and 244 can be omitted in this embodiment.

Figure 4E:
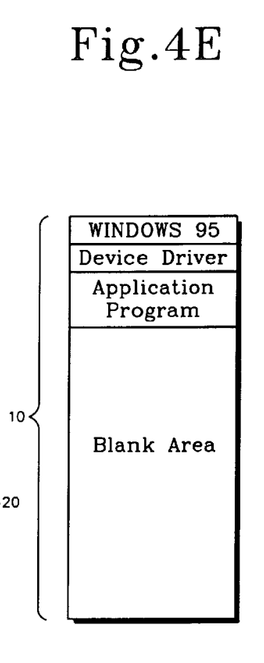

It is illustrated at step S250 that the test program on the second partition region 20 is executed to test the computer system and the second partition region 20 is erased to set the first partition region 10 as a boot driver region. At step S252, if the computer system with the duplicated hard disk is powered, it can be booted with the operating system installed in the second partition region 20. This is because the second partition region 20 is previously set as a boot driver region at step S222 of FIG. 3A. At the same time, at the step S254, the test program installed in the second partition region 20 is executed to test whether or not the computer system is normally operated. The control proceeds to step S254, wherein the second partition region 20 is erased, as shown in FIG. 4E, and then the first partition region 10 is set as a boot driver region.

From FIG. 4D, it is illustrated that the booting of the computer system may be accomplished with a Wmdows 95 operating system. Alternatively, the computer system may be booted with DOS or a single DOS for Windows 95. Herein, the single DOS means a DOS function with which the computer system can be re-booted in consideration of execution of the program or command compatible with a conventional DOS while the Windows 95 operating system is operating. The single DOS is incorporated in the Windows 95 operating system.

After completion of the test operation, if Windows 95 is used as the operating system, the computer system can be powered off even though it is not terminated normally. This is because the computer system is booted with the Windows 95 installed in the second partition region 20. Accordingly, even if the computer system is unnormally powered off, the Windows 95 installed in the first partition region can be free from danger.

In the above described embodiment, to define the first and second partition regions on the hard disk, two steps of partitioning processes must be performed. However, a single step of partitioning may be performed to define two partition regions on the hard disk. Similarly to the two steps of partitioning processes, one of the two partition regions may be defined as a whole region, and the other may be defined as a part of the whole region and partially overlapped with the whole region. If the hard disk is partitioned into two partition regions by a single partitioning step, the program files necessary for operations of the computer system may be, after partitioning the hard disk, sequentially installed on both the first and second regions or only on the second region which is overlapped with a part of the first partition region.

As described above, a computer system test according to a testing method of the present invention can be performed under an operating system, which is installed in a second partition region, different from an original operating system in a first partition region.

Also, since the computer system can be booted using a hard disk, there is no need to use an additional booting floppy disk. Accordingly, the time required for booting the computer system can be shortened.

Even though Windows 95 is used as an operating system of the computer system, this system can be powered off without executing a shut down program within the Windows 95 operating system. Accordingly, the time required for testing the computer system can also be shortened.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of testing a computer system with a hard disk which is physically formatted, comprising the steps of:
   defining a whole region of said hard disk as a first partition region;
   installing a plurality of program files necessary for operations of said computer system in said first partition region;
   partitioning said hard disk to define a part of said first partition region as a second partition region, said second partition region being overlapped with part of said first partition region;
   setting said second partition region as a boot driver region;
   installing said program files in said second partition region;
   re-booting said computer system using said second partition region;
   installing a test program file in said second partition region to form an original hard disk;
   testing said computer system using said test program file in said second partition region;
   erasing said second partition region overlapped with said first partition region; and
   setting said first partition region as a boot driver region.

2. The method according to claim 1, the step of defining said first partition region comprising partitioning said hard disk to use said whole region of said hard disk as said first partition region, and logically formatting said first partition region.

3. The method according to claim 1, the step of installing said plurality of program files necessary for the operations of said computer system comprising installing an operating system in said first partition region, installing a plurality of device drivers in said first partition region and installing a plurality of application programs in said first partition region.

4. The method according to claim 1, the step of partitioning said hard disk to define said second partition region comprising detecting a starting position of areas where data is not stored on said hard disk, and setting said starting position as a starting position of said second partition region.

5. The method according to claim 1, the step of partitioning said hard disk to define said second partition region comprising setting a starting position of said second partition region by a user.

6. The method according to claim 1, the step of re-booting said computer system being performed in accordance with an operating system located in said second partition region.

7. The method according to claim 1, the step of installing said test program file in said second partition region comprising duplicating said plurality of program files installed in said first partition region into said second partition region.

8. The method according to claim 1, further comprising the steps of duplicating, after installing said test program file in said second partition region, said program files of said original hard disk on a plurality of other hard disks to form a plurality of duplicated hard disks, and establishing one of said duplicated hard disks in a computer system.

9. A method of testing a computer system with a hard disk which is physically formatted, comprising the steps of:
   partitioning said hard disk to define a whole region of said hard disk, as a first partition region and a part of said first partition region as a second partition region, said second partition region being overlapped with part of said first partition region;
   installing a plurality of program files necessary for operations of said computer system in said first partition region;
   setting said second partition region as a boot driver;
   installing said program files in said second partition region;
   re-booting said computer system using said second partition region;

installing a test program file in said second partition region to form an original hard disk;

testing said computer system using said test program file in said second partition region;

erasing said second partition region overlapped with said first partition region; and setting said first partition region as a boot driver region.

10. The method according to claim 9, the step of partitioning said hard disk comprising detecting a starting position of areas where data is not stored on said hard disk, and setting said starting position as a starting position of said second partition region.

11. The method according to claim 9, the step of partitioning said hard disk to define said second partition region comprising setting a starting position of said second partition region by a user.

12. The method according to claim 9, the step of installing said test program file in said second partition region comprising duplicating said plurality of program files installed in said first partition region into said second partition region.

13. The method according to claim 9, further comprising the steps of duplicating, after installing said test program file in said second partition region, said program files of said original hard disk on a plurality of other hard disks to form a plurality of duplicated hard disks, and establishing one of said duplicated hard disks in a computer system.

14. A method of testing a computer system with a hard disk which is physically formatted, comprising the steps of:

partitioning said hard disk to define a whole region of said hard disk as a first partition region and a part of said first partition region as a second partition region, said second partition region being overlapped with part of said first partition region;

sequentially installing a plurality of program files necessary for operations of said computer system in said first and second partition regions;

setting said second partition region as a boot driver;

re-booting said computer system using said second partition region;

installing a test program file in said second partition region to form an original hard disk;

testing said computer system using said test program file in said second partition region;

erasing said second partition region overlapped with said first partition region; and setting said first partition region as a boot driver region.

15. The method according to claim 14, further comprising the steps of duplicating, after installing said test program file in said second partition region, said program files of said original hard disk on a plurality of other hard disks to form a plurality of duplicated hard disks, and establishing one of said duplicated hard disks in a computer system.

* * * * *